July 26, 1938.  W. E. DAVIS  2,124,667
TOY WALKING ANIMAL
Filed May 8, 1937
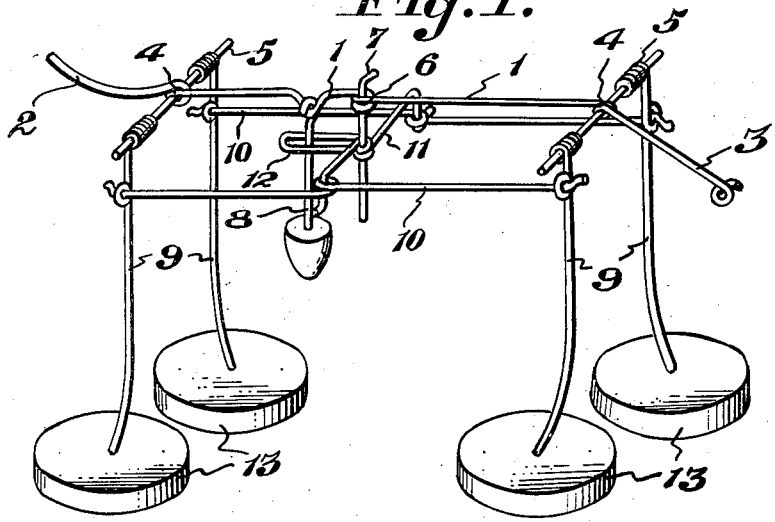
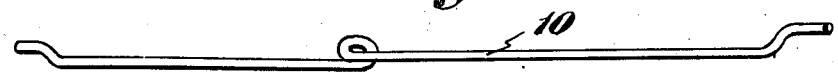
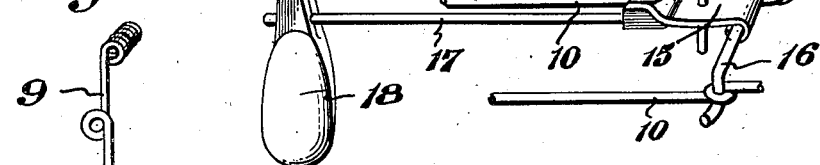
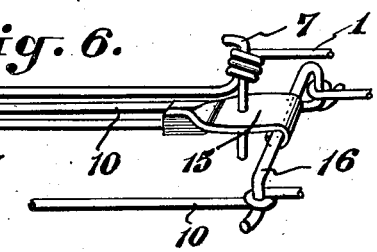
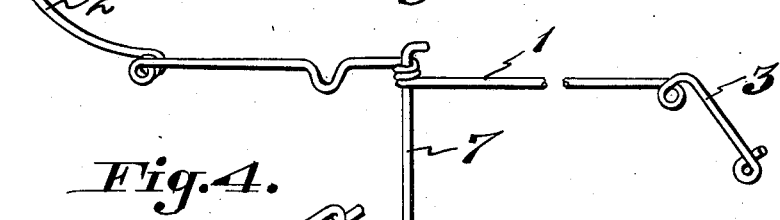
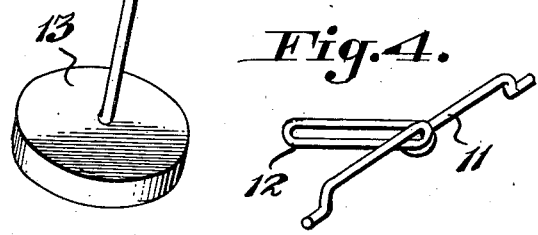
INVENTOR,
Wm. E. Davis
BY Glascock Downing & Seebold
ATTORNEYS.

Patented July 26, 1938

2,124,667

UNITED STATES PATENT OFFICE 2,124,667

TOY WALKING ANIMAL

William Edwin Davis, Seven Springs, N. C.

Application May 8, 1937, Serial No. 141,548

5 Claims. (Cl. 46—149)

This invention is an improvement in toy walking animals, and has for its object to provide a walking frame of an animal which will move down an inclined plane or, when propelled, on a level, with a natural motion, the two legs on one side advancing alternately with the two legs on the opposite side.

A further object is to provide such a toy with a pendulum so related to the other parts of the frame as to cause the legs on the opposite sides to be lifted alternately as the frame advances.

Another object is to provide a toy of this character which is cheap, efficient, and capable of creating much amusement.

I attain these objects by the mechanism illustrated in the accompanying drawing, in which:

Fig. 1 is a perspective view of the entire frame;

Fig. 2 is an elevation of a leg bar and foot-disk;

Fig. 3 is a plan view of one of the side bars connecting the legs;

Fig. 4 is a plan view of one form of a cross bar;

Fig. 5 is a side view of the main longitudinal frame bar;

Fig. 6 is a perspective view of a modification of the cross bar and its connection with the main frame bar.

1 is the main frame bar which may have an extension 2 at the rear end to represent the tail of the animal and a front extension 3 to which a cord may be attached to propel the device. It is noted that the front extension inclines downwardly. This places the point of the propelling force below the center of gravity.

The main frame bar which may be of wire has one or more complete loops 4 formed therein near each of its ends to form bearings for horizontal pintles 5. The main frame bar has also one or more complete loops 6 intermediate loops 4 to form a bearing for a vertical pintle 7. A bend or incomplete loop may be formed in the rear of the loop 6 for suspending a pendulum 8.

Pivoted on pintles 5, on each pintle on each side of the main frame bar are legs 9. The legs may be and preferably are of wire and are revolubly attached to the pintles by one or more loops of the wire.

Longitudinal members or side bars 10 interconnect the legs of each side. Hence the legs on each side move together. A cross bar 11 connects the side bar of one pair of legs to the side bar of the opposite pair. This cross bar 11 is revolubly mounted on the vertical pintle 7 so that one pair of legs may be stationary while the other pair swings forward. The cross bar 11 may have a loop 12 extending to the rear through which loop the stem of the pendulum passes or the connection of the pendulum and cross bar may be made as shown in Fig. 6 as hereinafter described. By virtue of this connection the forward motion of one pair of legs swings the pendulum and throws the center of gravity from one side to the other and if the pendulum on the other hand be swung laterally it will tend to move one pair of legs forward. It is to be noted that the moving pair of legs which are the ones not in contact with the surface on which the animal frame rests bring the center of gravity to their side whereupon they contact the surface and the other pair is raised out of contact with the surface on which the animal frame rests and the propelling power swings the latter pair of legs forward or if the animal frame is on an inclined plane the force of gravity carries them forward.

The movement of the stem of the pendulum assists or is assisted by the movement of the legs according to whether it forges ahead or lags behind the movement of the legs.

The free extremities of the legs have pads or disks 13 rigidly attached thereto. These pads or disks are preferably of rubber but may be of fabric, composition or wood. They must however be attached to the legs in such a way that when the device is stood upon a level surface only the inner edges of the disks will rest on the surface and when the device is tilted laterally to such an extent that the disks or feet of the legs on one side rest flat on the surface the disks or feet of the legs on the other side will be free of the surface. This may be accomplished by bending the lower portion of the leg outwardly as shown or, obviously by securing the disks to the legs so that the plane of its lower flat surface inclines inwardly when the device is standing on an "even keel".

The operation of the device will now be described. The device will stand on the floor with all four disks resting on their inner edges only. It is necessary that the frame acquire a slight lateral swing before either pair of legs is free to swing. It is found that in practice it is not necessary to swing the frame over to one side of the other as accidental inequalities will always affect this lateral swaying almost instantaneously with the beginning of propulsion. Difference of frictional resistance to movement of one pair of disks and the other will cause one to lag behind whereupon the pendulum is swung by the loop 12 and the center of gravity is moved to one side. The string attached to the frame bar at 3 may if found necessary be stretched momentarily to one side or the lateral swing may be given directly to the frame. The inventor wishes to state that the above named expedients are not necessary and the device will operate without resorting thereto.

The device is then propelled for example by pulling a string. It will lean shortly to one side or the other and the pair of disks on one side being in contact with the supporting surface form stationary parts with relation to which the other pair swing forward. The pendulum is by this action swung to the side of the pair of legs out of contact with the surface. The device sways to that side the feet on that side rest flat on the supporting surface; the pull of the string then causes the feet now out of contact with the surface to move forward and this is repeated in rapid succession. The action and reaction of the pendulum and the forward pull (which may be due to gravity where an inclined plane is used) keep the alternate action of the legs on each side constant and regular. All of the parts may be made of wire but the pendulum is preferably a piece of heavy metal and the foot disks are preferably made of rubber.

In the modification shown in Fig. 6 a metal plate 15 is attached to the cross bar 16 and the pintle 7 passes through an aperture in said metal plate. A spring metal strip 17 connects the plate to the stem of the pendulum 18. The operation is the same in all respects as that of the first described form.

I claim:

1. In a walking toy, a frame comprising a longitudinal main frame bar, a horizontal pintle near each end attached to said main frame bar, a vertical pintle intermediate said horizontal pintles attached to said main frame bar, a pendulum depending from said main frame bar, leg members pivoted one on each side of said main frame bar on said horizontal pintles, side bars each connecting the two legs on one side of the frame and a cross bar pivotally connected to the side bars, pivoted to the vertical pintle, and means connecting said cross bar to the stem of the pendulum.

2. The device as claimed in claim 1 in which the main frame bar has ring loops through which the pintles pass and a bend from which the pendulum depends.

3. In a walking toy frame, adapted to be propelled over a level surface or to progress automatically down an inclined plane, a main frame bar, horizontal pintles on which said main frame bar is supported, a vertical pintle extending from said main frame bar intermediate said horizontal pintle, leg bars pivoted on said horizontal pivots on each side of said main bar frame, a side bar on each side of the frame connecting the leg bars on that side, a cross bar connecting said side bars, a pendulum depending from said main frame bar and means connecting said cross bar with said vertical pintle and attached to the stem of said pendulum whereby during forward movement the frame will sway from side to side and the legs on each side swing forward alternately.

4. The device as claimed in claim 3 in which the leg bars are bent outwardly at their lower portion and pads are attached to the free ends of said leg bars whereby the pads will rest on any level surface on which the frame is set, for a small section of their perimeters only.

5. The device as claimed in claim 3 in which disks are attached to the free ends of the leg bars at such an angle with the vertical leg bar that when the disks on one side rest flat on a level surface the disks on the other side will be free of the surface.

WM. EDWIN DAVIS.